United States Patent [19]

Ishikawa et al.

[11] Patent Number: 4,962,679
[45] Date of Patent: Oct. 16, 1990

[54] METHOD OF CONTROLLING SPEED REDUCTION RATIO FOR A CONTINUOUSLY VARIABLE SPEED TRANSMISSION

[75] Inventors: Yoshikazu Ishikawa; Kouji Yamaguchi, both of Saitama; Koji Sasajima, Tokyo, all of Japan

[73] Assignee: Honda Giken Kogyo Kabushiki Kaisha, Tokyo, Japan

[21] Appl. No.: 260,186

[22] Filed: Oct. 19, 1988

[30] Foreign Application Priority Data

Oct. 20, 1987 [JP] Japan .................. 62-264838

[51] Int. Cl.$^5$ .......................... B60K 41/06
[52] U.S. Cl. .......................... 74/866; 74/858
[58] Field of Search .......... 74/857, 858, 865, 866, 74/877

[56] References Cited

U.S. PATENT DOCUMENTS

| | | | |
|---|---|---|---|
| 4,291,594 | 9/1981 | Baudoin | 74/866 X |
| 4,370,904 | 2/1983 | Muller et al. | 74/858 |
| 4,383,456 | 5/1983 | Ganoung | 74/866 |
| 4,493,228 | 1/1985 | Vukovich et al. | 74/858 |
| 4,561,327 | 12/1985 | Niwa et al. | 74/866 |
| 4,594,666 | 6/1986 | Cornell | 74/866 X |
| 4,594,916 | 6/1986 | Ito et al. | 74/866 |
| 4,627,311 | 12/1986 | Yokooku et al. | 74/866 |
| 4,637,279 | 1/1987 | Itoh et al. | 74/866 |
| 4,653,006 | 3/1987 | Osanai et al. | 364/424 |
| 4,689,745 | 8/1987 | Itoh et al. | 364/424.1 |
| 4,689,956 | 9/1987 | Hein | 60/449 |
| 4,727,771 | 3/1988 | Niwa et al. | 74/866 |
| 4,750,598 | 6/1988 | Danno et al. | 74/857 X |
| 4,753,133 | 6/1988 | Itoh et al. | 74/865 X |
| 4,759,236 | 7/1988 | Tezuka et al. | 74/866 |

FOREIGN PATENT DOCUMENTS

| | | |
|---|---|---|
| 0168540 | 1/1986 | European Pat. Off. . |
| 0240178 | 10/1987 | European Pat. Off. . |
| 58-191360 | 11/1983 | Japan . |
| 62-4643 | 1/1987 | Japan . |
| 62-4646 | 1/1987 | Japan . |
| 62-204052 | 9/1987 | Japan . |
| 62-237164 | 10/1987 | Japan . |

Primary Examiner—Dwight Diehl
Attorney, Agent, or Firm—Lyon & Lyon

[57] ABSTRACT

The speed reduction ratio of a continuously variable speed transmission is controlled by setting a reference engine speed according to a parameter representing a driver's intention of acceleration, such as the depression of an accelerator pedal, and controlling the speed reduction ratio so as to equalize the engine rotational speed with the reference engine speed. When the parameter is lowered such as by releasing the accelerator pedal, the process of controlling the speed reduction ratio due to a reduction in the reference engine speed caused by the reduction in the parameter is started after a certain time delay.

1 Claim, 3 Drawing Sheets

METHOD OF CONTROLLING SPEED REDUCTION RATIO FOR A CONTINUOUSLY VARIABLE SPEED TRANSMISSION

BACKGROUND OF THE INVENTION

The present invention relates to a method of controlling the speed reduction ratio in a continuously variable speed transmission for use in a motor vehicle.

One known method of controlling the speed reduction ratio of a continuously variable speed transmission mounted on a motor vehicle to control the running of the motor vehicle is disclosed in Japanese Laid-Open Patent Publication No. 62(1987)-237164, for example. According to the known control method, a reference engine speed is preset according to an opening of an throttle valve of the engine of the motor vehicle, and the rotational speed of the engine is controlled so as to be equalized with the reference engine speed.

When the accelerator pedal of the motor vehicle is suddenly released to close the throttle valve while the motor vehicle is running at a certain speed reduction ratio, the reference engine speed is also suddenly lowered. Since the actual engine speed is determined by the speed reduction ratio and the vehicle speed, the speed reduction ratio (which is a value of the input speed divided by the output speed) is varied toward a top position (i.e., the speed reduction ratio is decreased).

If the speed reduction ratio is varied too quickly toward the top speed position when the accelerator pedal is suddenly released, the following problem arises: In the event that the driver of the motor vehicle releases and then depresses the accelerator pedal in a short time, since the speed reduction ratio is quickly reduced when the accelerator pedal is released, the power available from the transmission is not large enough when the accelerator pedal is subsequently depressed again, and the driver's feeling with respect to the driving of the motor vehicle is impaired.

SUMMARY OF THE INVENTION

In view of the aforesaid drawbacks, it is an object of the present invention to provide a method of controlling the speed reduction ratio of a continuously variable speed transmission on a motor vehicle while preventing the power transmitted through the transmission from being lowered when the accelerator pedal of the motor vehicle is released and then depressed in a short period of time.

According to the present invention, there is provided a method of controlling the speed reduction ratio of a continuously variable speed transmission by setting a reference engine speed according to a parameter representing a driver's intention of acceleration, such as an opening of a throttle valve, an amount of depression of an accelerator pedal, or the like, and controlling the speed reduction ratio so as to equalize an actual engine speed with said reference engine speed. When the parameter is lowered such as by releasing the accelerator pedal, the process of controlling the speed reduction ratio due to a reduction in the reference engine speed caused by the reduction in the parameter is started after a certain time delay.

Therefore, in the event that the driver releases and then depresses the accelerator pedal in a short period of time, the speed reduction ratio remains as it is during the time delay, thereby preventing the driver's feeling from being impaired by any shortage of the power which would otherwise be caused when the accelerator pedal which has been released is depressed again.

Further scope of applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
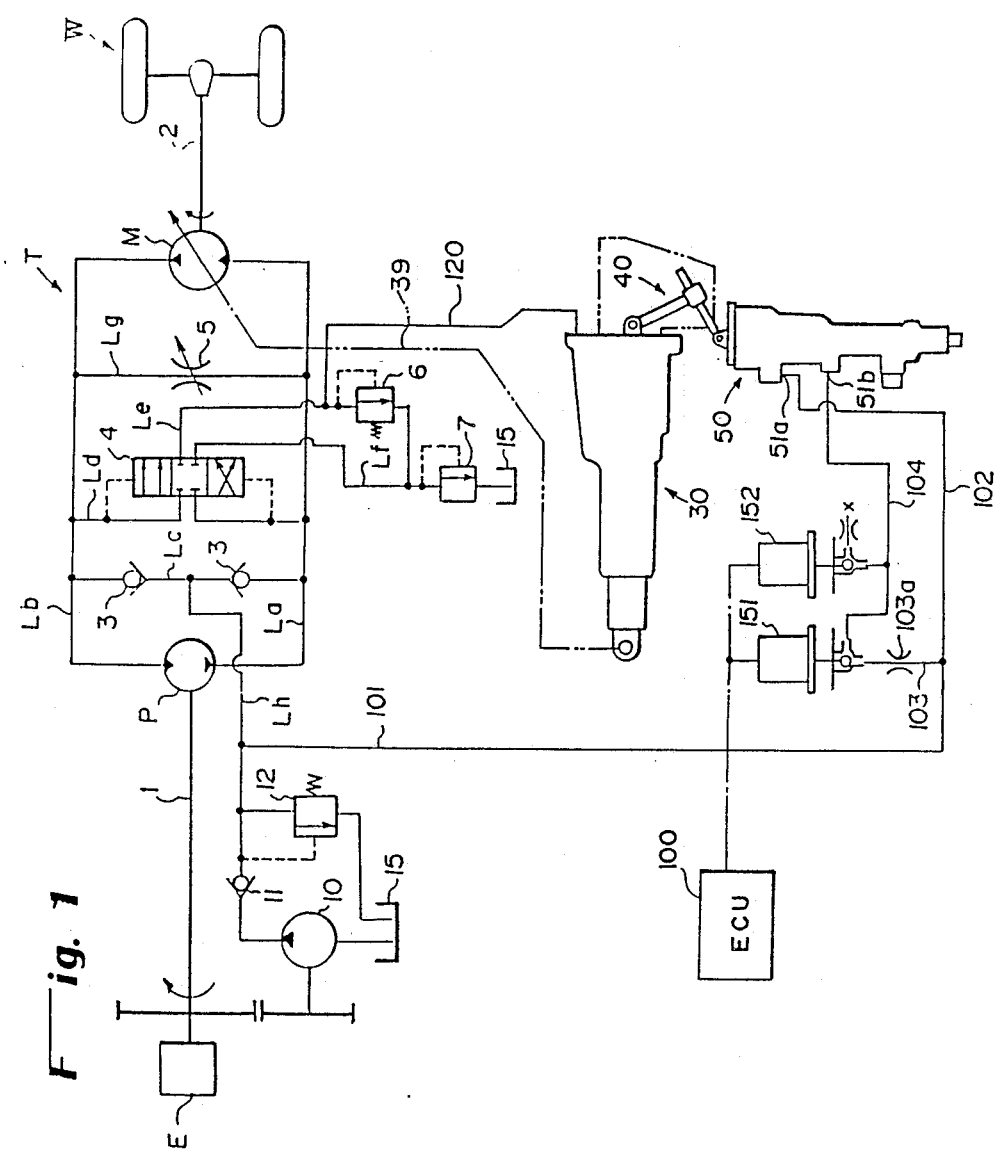
FIG. 1 is a hydraulic circuit diagram of a continuously variable speed transmission, the speed reduction ratio of which is controlled by a method according to the present invention.

FIG. 1 shows a hydraulic circuit of a continuously variable speed transmission, the speed reduction ratio of which is controlled by a method of the present invention. The continuously variable speed transmission, generally indicated by T, has a hydraulic pump P of the fixed displacement type which is drivable by an engine E through an input shaft 1, and a hydraulic motor M of the variable displacement type which has an output shaft 2 for driving wheels W. The hydraulic pump P and the hydraulic motor M are hydraulically coupled to each other by a closed hydraulic circuit having a first hydraulic passage or line La communicating with the outlet port of the pump P and the inlet port of the motor M, and a second hydraulic line Lb communicating with the inlet port of the pump P and the outlet port of the motor M.

A charging pump 10 drivable by the engine E has an outlet port connected to the closed hydraulic circuit through a charging hydraulic line Lh having a check valve 11 and a third hydraulic line Lc having a pair of check valves 3. Working oil which is drawn from an oil sump 15 by the charging pump 10 and regulated in its pressure by a charging pressure relief valve 12 is supplied to a lower-pressure one of the hydraulic lines La, Lb through the action of the check valves 3. To the closed hydraulic circuit, there is also connected a fourth hydraulic line Ld having a shuttle valve 4 coupled to fifth and sixth hydraulic lines Le, Lf that have high and Low pressure relief valve 6, 7 connected to the oil sump 15. The shuttle valve 4 comprises a two-port three-position directional control valve which is operable in response to the difference between hydraulic pressures in the first and second hydraulic lines La, Lb for communicating a higher-pressure one of the first and second hydraulic lines La, Lb with the fifth hydraulic line Le and communicating the lower-pressure line with the sixth hydraulic line Lf. The relief pressure from the higher-pressure hydraulic line is regulated by the higher-pressure relief valve 6, and the relief pressure from the lower-pressure hydraulic line is regulated by the lower-pressure relief valve 7.

Between the first and second hydraulic lines La, Lb there is connected a seventh hydraulic line Lg providing a short circuit therebetween, the seventh hydraulic line Lg having a clutch valve 5 comprising a variable restrictor for controlling the opening of the seventh hydraulic line Lg under the control of a valve control unit (not shown). Therefore, the transmission of driving power from the hydraulic pump P to the hydraulic motor M can be controlled by controlling the clutch valve 5.

The displacement of the hydraulic motor M is controlled to control the speed reduction ratio of the continuously variable speed transmission T by an actuator comprising first and second ratio control servo units 30, 50 which are operatively interconnected by a link mechanism 40. The hydraulic motor M comprises a swash-plate axial-piston motor with its displacement controllable by controlling the angle of inclination of the swash plate with the ratio control servo units 30, 50.

Operation of the ratio control servo units 30, 50 is controlled by solenoid valves 151, 152, the duty cycle of which is controlled by a signal from a controller 100. The controller 100 is supplied with signals respectively representing a vehicle speed V, an engine rotational speed Ne, a throttle valve opening $\theta$th, a swash plate angle $\theta$tr of the hydraulic motor M, and an opening (or depression) $\theta$acc of the accelerator pedal of the motor vehicle which is operated by the driver. Based on the supplied signals, the controller 100 produces a control signal to control the solenoid valves 151, 152 for achieving a desired running mode or condition for the motor vehicle.

Figure 2:
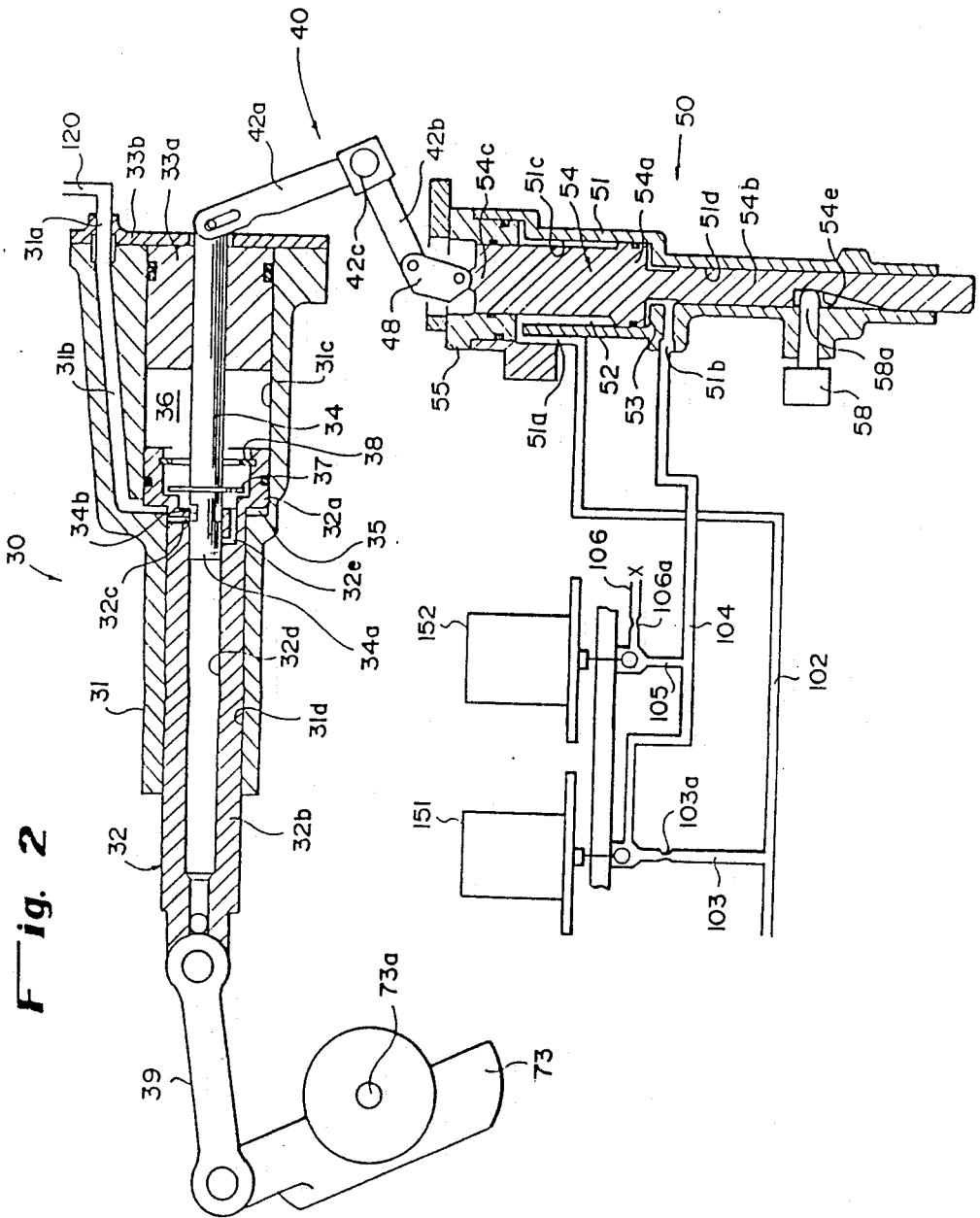
FIG. 2 is a cross-sectional view of first and second ratio control servo units.

The structure and operation of the servo units 30, 50 will be described below with reference to FIG. 2.

The first ratio control servo unit 30 controls the angle of the swash plate of the hydraulic motor M under a higher hydraulic pressure introduced via a high-pressure line 120 branched off the fifth hydraulic line Le from the closed circuit of the continuously variable speed transmission T through the shuttle valve 4. The second ratio control servo unit 50 is operatively coupled to the first ratio control servo unit 30 through the link mechanism 40 for controlling the operation of the servo unit 30.

The first ratio control servo unit 30 has a housing 31 having a connector port 31a to which the high-pressure line 120 is connected, a piston 32 horizontally (as shown) slidably fitted in the housing 31, and a spool 34 slidably fitted coaxially in the piston 32. The piston 32 comprises a piston member 32a on its righthand end, and a cylindrical rod member 32b extending coaxially from the piston member 32a to the left (as shown in FIG. 2). The piston member 32a is fitted in a cylinder bore 31c defined in the housing 31, dividing the cylinder bore 31c into lefthand and righthand (as shown in FIG. 2) cylinder chambers 35, 36. The rod member 32b is slidably fitted in a rod bore 31d which is defined coaxially with the cylinder bore 31c and smaller in diameter than the cylinder bore 31c. The righthand cylinder chamber 35 is closed off by a plug 33a and a cover 33b, through which the spool 34 extends.

The lefthand cylinder chamber 35 is held in communication with the high-pressure line 120 through a hydraulic passage 31b. The piston 32 is therefore pushed to the right under the hydraulic pressure introduced from the high-pressure line 120 into the lefthand cylinder chamber 35.

The spool 34 has on its inner distal end a land 34a snugly fitted in a spool bore 32d defined coaxially in the rod member 32b. The spool 34 also has a pair of diametrically opposite recesses 34b defined therein on the righthand side of the land 34a and having prescribed axial dimensions. A stop ring 37 is fixedly fitted over the spool 34 rightwardly of the recesses 34b. The land 34a is prevented from moving out of the spool bore 32d by the stop ring 37 which engages a stop ring 38 secured to the inner peripheral surface of the piston member 32a.

The piston 32 has a discharge passage 32e defined therein for venting the righthand cylinder chamber 36 through the spool bore 32d to the oil sump (not shown in FIG. 2) when the spool 34 is moved to the right, and a communication passage 32c defined therein for communicating the righthand cylinder chamber 36 with the lefthand cylinder chamber 35 through the recesses 34b upon rightward movement of the spool 34.

By moving the spool 34 to the right from the illustrated position, the land 34a closes the communication passage 32c and opens the discharge passage 32e. Therefore, oil under pressure flowing from the high-pressure line 120 via the hydraulic passage 31b acts in only the lefthand cylinder chamber 35 to move the piston 32 to the right in synchronism with the spool 34.

When the spool 34 is moved to the left, the recesses 34b bring the communication passage 32c into communication with the righthand cylinder chamber 36, and the land 34a closes the discharge passage 32e. Consequently, the high-pressure oil acts in both the lefthand and righthand cylinder chambers 35, 36. Because the piston member 32a has different pressure-bearing areas facing into the lefthand and righthand cylinder chambers 35, 36, the piston 32 is moved to the left in synchronism with the spool 34.

When the spool 32 is stopped somewhere in its stroke, the piston 32 is also stopped in a hydraulically balanced condition due to the balanced pressures in the lefthand and righthand cylinder chambers 35, 36.

By moving the spool 34 to the left or the right, the piston 32 can be moved in synchronism with the spool 34 under the high hydraulic pressure introduced from the high-pressure line 120. As a consequence, the swash plate 73 of the hydraulic motor M which is operatively coupled to the piston 32 through a link 39 can be angularly moved about a shaft 73a to variably control the displacement of the motor M.

The spool 34 is operatively connected to the second ratio control servo unit 50 through the link mechanism 40. The link mechanism 40 comprises a first link member 42 having two arms 42a, 42b angularly movable about a shaft 42c and extending substantially perpendicularly to each other, and a second link member 48 pivotally coupled to the distal end of the arm 42b of the first link member 42. The upper end of the arm 42a is pivotally connected to the righthand end of the spool 34 of the first ratio control servo unit 30. The lower end of the second link member 48 is pivotally coupled to a spool 54 of the second ratio control servo unit 50. When the spool 54 is moved vertically (FIG. 2), therefore, the spool 34 of the first ratio control servo unit 30 is moved horizontally.

The second ratio control servo unit 50 comprises a housing 51 having ports 51a, 51b to which two respective hydraulic lines 102, 104 are connected, and the spool 54 vertically slidably fitted in the housing 51. The spool 54 comprises a piston member 54a and a rod member 54b extending coaxially downwardly from the piston member 54a. The piston member 54a is fitted in a cylinder bore 51c defined vertically in the housing 51 and closed by a cover 55, dividing the cylinder bore 51c into upper and lower cylinder chambers 52, 53. The rod member 54b is slidably fitted in a rod bore 51d defined in the housing 51 and extending coaxially downwardly from the cylinder bore 51c.

The rod member 54b has a recess 54e defined in a side surface thereof and including a tapered surface. A top position detecting switch 58 mounted on the housing 51 has a spool 58a projecting into the recess 54e. Upon the upward movement of the spool 54, the spool 58a is displaced laterally to the left by the tapered surface for enabling the switch 58 to detect whether the speed reduction ratio of the hydraulic motor M is minimized or not.

The upper and lower cylinder chamber 52, 53 are held in communication with the respective hydraulic lines 102, 104 through ports 51a, 51b respectively. The piston 54 is vertically moved under a hydraulic pressure acting on the piston member 54a which is determined by the pressure of working oil supplied via the hydraulic lines 102, 104 into the cylinder chambers 52, 53 and the pressure-bearing area of the piston member 54a that faces into the cylinder chamber 52, 53. The vertical movement of the spool 54 is transmitted through the link mechanism 40 to the spool 34 of the first ratio control servo unit 30 to move the spool 34 to the left or the right. Consequently, by controlling the hydraulic pressure supplied through the hydraulic lines 102, 104, the movement of the spool 34 of the first ratio control servo unit 30 can be controlled, and the piston can be moved to control the angel of the swash plate 73 of the hydraulic motor M to vary the displacement thereof for the control of the speed reduction ratio. More specifically, when the spool 54 of the second ratio control servo unit 50 is moved upwardly, the piston 32 of the first ratio control servo unit 30 is moved to the right to reduce the swash plate angle, thereby reducing the displacement of the hydraulic motor M to decrease the speed reduction ratio.

The hydraulic pressure in the hydraulic line 102 connected to the upper cylinder chamber 52 via the port 51a is the hydraulic pressure discharged from the charging pump 10, as regulated by the charging pressure relief valve 12, and introduced via a hydraulic line 101 connected to the hydraulic line 102. The hydraulic pressure in the hydraulic line 104 connected to the lower cylinder chamber 53 via the port 51b is the hydraulic pressure supplied from a hydraulic line 103 branched off the hydraulic line 102 and having an orifice 103a, as controlled by the two solenoid valves 151, 152 with their duty cycle being controlled by the controller 100. The solenoid valve 151 serves to control, dependent on its controlled duty cycle, the rate of flow of the working oil from the hydraulic line 103 into the hydraulic line 104. The solenoid valve 152 is disposed between a hydraulic line 105 branched off the hydraulic line 104 and a hydraulic line 106 communicating with a drain via an orifice 106a for controlling the rate of flow of the working oil from the hydraulic line 104 into the drain dependent on the controlled duty cycle of the solenoid valve 152.

Therefore, the charging pressure as regulated by the charging pressure relief valve 12 and supplied via the hydraulic line 102 acts in the upper cylinder 52. The lower cylinder 53 is supplied with a hydraulic pressure from the hydraulic line 104 which is made lower than the charging pressure by the solenoid valves 151, 152. Since the pressure-bearing area of the piston member 54a facing into the upper cylinder chamber 52 is smaller than the pressure-bearing area of the piston member 54a facing into the lower cylinder chamber 53, the forces acting on the spool 54 due to the respective hydraulic pressure in the upper and lower cylinder chambers 52, 53 are brought into equilibrium when the hydraulic pressure in the lower cylinder chamber 53 is a balancing pressure Pl lower than the hydraulic pressure Pu in the upper cylinder chamber 52 (Pu>Pl). As a consequence, by controlling the hydraulic pressure to be supplied from the hydraulic line 104 into the lower cylinder chamber 53 to be higher than the balancing pressure Pl, the spool 54 can be moved upwardly to reduce the swash plate angle of the hydraulic motor M for decreasing the speed reduction ratio. Conversely, by controlling the hydraulic pressure to be supplied into the lower cylinder chamber 53 to be lower than the balancing pressure Pl, the spool member 54 can be moved downwardly to increase the swash plate angle for increasing the speed reduction ratio.

The solenoid valves 151, 152 are controlled in operation by a signal from the controller 100. Therefore, the signal from the controller 100 is effective in controlling the operation of the first and second ratio control servo units 30, 50, controlling the displacement of the hydraulic motor M, and controlling the speed reduction ratio.

Figure 3:
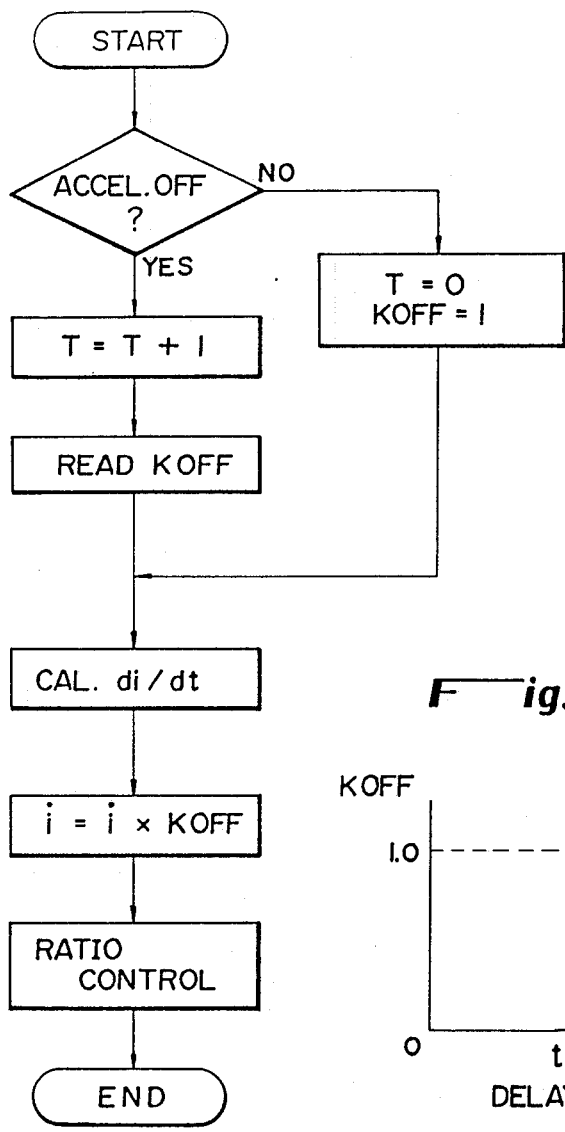
FIG. 3 is a flowchart of a control sequence for controlling the speed reduction ratio.

The control of the speed reduction ratio with the controller 100 will be described with reference to the flowchart of FIG. 3.

First, whether or not the accelerator pedal of the motor vehicle is released is determined from the signal indicating the opening or depression $\theta$acc of the accelerator pedal. If the accelerator pedal is not released, a delay timer counter T is reset to "0", and a reduction speed rate coefficient $K_{OFF}$ is set to "1".

Figure 4:
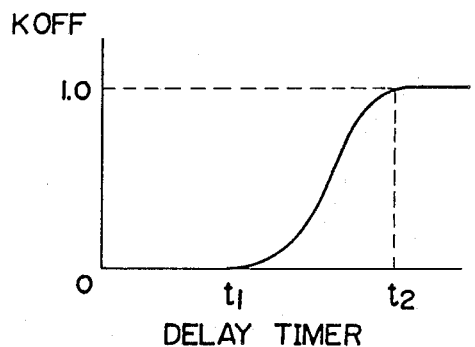
FIG. 4 is a graph showing the relationship between delay time and a reduction speed rate coefficient.

If the accelerator pedal is released, "1" is added to the delay timer counter T to start counting time. The delay timer counter T counts time after the accelerator pedal has been released by adding "1" each time the control sequence of FIG. 3 is repeated in a prescribed period of time. Then, a speed reduction rate coefficient $K_{OFF}$ is read from the graph of FIG. 4 based on the time counted by the delay timer counter T. The speed reduction rate coefficient $K_{OFF}$ remains "0" until a period of time $T_1$ elapses, then increases with time until a period of time $T_2$ elapses, and finally remains "1" after the time period $T_2$ has elapsed.

Then, the basic rate of change di/dt of the speed reduction ratio is calculated as follows irrespective of how the accelerator pedal is depressed.

The speed reduction ratio i{=(input speed)/(output speed)} is expressed by the following equation (1):

$$i = N/(C^* V) \qquad (1)$$

where N is the engine rotational speed, V is the vehicle speed, and C' is a constant. The rate of change of the speed reduction ratio di/dt is obtained by differentiating the equation (1) with time t, as follows:

$$di/dt = 1/(C^* V)^* \{(dN/dt) - N/(C^* V)^* C^*(dV/dt)\} \qquad (2)$$

By replacing the rate of change dN/dt of the engine speed with the rate of change dNo/dt of the reference engine speed, the acceleration dv/dt with a predicted acceleration dVo/dt, and putting $C' = 1/C$ in the equation (2), $$di/dt = -C*\{(N/V^2)*(dVo/dt)\} + \{c*(1/V)*(dNo/dt)\} \quad (3)$$

Therefore, the rate of change di/dt of the speed reduction ratio is given as the sum of component dia/dt $(= -C*N/V^2*dvo/dt)$ corresponding to the predicted acceleration dVo/dt and a component din/dt $(=C*1/V*dNo/dt)$ corresponding to the rate of change dNo/dt of the reference engine speed. The predicted acceleration dVo/dt is obtained from the following equations (4) through (7):

The output power Pe of the engine E itself is expressed by:

$$Pe = Ru + Ra + Pa \quad (4)$$

where Ru is the resistance of the road, Ra is the resistance of air, and Pa is the reserved power of the engine E. From equation (4), the reserved power of the engine E is given by:

$$Pa = Pe - (Ru + Ra) \quad (5)$$

The reserved engine power Pa can also be expressed by equation (6):

$$Pa = (W + dW)*1/g*dVo/dt*(V*10^3/60^2)*1/75 \quad (6)$$

From the equations (5) and (6), we get $$dVo/dt = (Pa*75*g*60^2)/\{(W + dW)*(V + 10^3)\} \quad (7)$$

Thus, the predicted acceleration dVo/dt can be calculated from the reserved power Pa of the engine E, which can be determined by the equation (5). The rate of change dNo/dt of the reference engine speed can be obtained by calculating the difference dN between the reference engine speed No corresponding to a parameter representing the driver's intention of acceleration or deceleration and the actual engine speed N, and searching a table or map of rates of change dNo/dt of the reference engine speed which are related to values of the difference dN in view of the driver's feeling as to the running of the motor vehicle and fuel consumption.

The basic rate of change di/dt of the speed reduction ratio is then multiplied by the speed reduction rate coefficient $K_{OFF}$ to determine a corrected rate of change di/dt, and the controller 100 applies a signal to the solenoid valves 151, 152 to achieve the determined rate of change di/dt for thereby controlling the speed reduction ratio.

When the accelerator pedal is not released, the speed reduction rate coefficient $K_{OFF}$ is "1" at all times, and the speed reduction ratio is controlled on the basis of the basic rate of change of the speed reduction ratio. When the accelerator pedal is released, the coefficient $K_{OFF}$ remains "0" until the time $T_1$ elapses, and no speed reduction ratio control is effected. Between the times $T_1$ and $T_2$, the speed reduction ratio is controlled at a rate which gradually approaches the basic rate of change of the speed reduction ratio with time. After the time $T_2$ has elapsed, the coefficient $K_{OFF}$ becomes "1", and the speed reduction ratio in controlled based on the basic rate of change of the speed reduction ratio.

While the opening or depression $\theta$acc of the accelerator pedal has been employed as the parameter representing the driver's intention for acceleration in the above description, other information such as the opening of the throttle valve of the engine may be employed as the parameter.

In the above embodiment, the continuously variable speed transmission comprises a hydraulic pump and a hydraulic motor. However, the method of the present invention is not limited to continuously variable speed transmissions of the illustrated type, but may be applied to continuously variable speed transmissions of other designs. The arrangement for controlling the speed reduction ratio is not limited to the illustrated electro-hydraulic system including the electric controller for controlling the solenoid valves to operate the servo units, but may be a system for generating a hydraulic pressure commensurate with the opening of a throttle valve to operate the servo units under the generated pressure.

With the present invention, as described above, when the accelerator pedal is released while the motor vehicle is running, the control of the speed reduction ratio due to a reduction in the reference engine speed caused by the release of the accelerator pedal is started with a certain time delay. Therefore, in the event that the driver releases and then depresses the accelerator pedal in a short period of time, the speed reduction ratio remains as it is during the time delay, thereby preventing the driver's feeling from being impaired by any shortage of the power which would otherwise be caused when the accelerator pedal which has been released is depressed again.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling a speed reduction ratio of a continuously variable transmission comprising the steps of:

determining a predicted acceleration $dV_o/dt$ calculated from a reserved power of an engine and a reference change rate $dN_o/dt$ of an engine speed obtained based on a parameter representing a driver's intention to accelerate or decelerate, calculating a change rate di/dt of speed reduction ratio by the following equation using the above values $$di/dt = -C_1*(N/V^2)*(dV_o/dt) + C_2*(1/V)*(dN_o/dt)$$

where $C_1$ and $C_2$ are constants, and an asterisk ("*") means multiplication, setting a reference engine speed corresponding to said parameter, and controlling the speed reduction ratio using said calculated change rate di/dt of speed reduction ratio as a control value so that an actual engine speed coincides with said reference engine speed;

said method further comprising the steps of:

keeping the speed reduction ratio unchanged for a prescribed delay time when said parameter is lowered, and then controlling the speed reduction ratio using a change rate corrected by a coefficient $K_{OFF}$ so that, with time, the change rate gradually approaches said calculated change rate di/dt.

* * * * *